L. F. WARD.
Potato Planter.
No. 18,716.
3 Sheets—Sheet 1.
Patented Nov. 24, 1857.
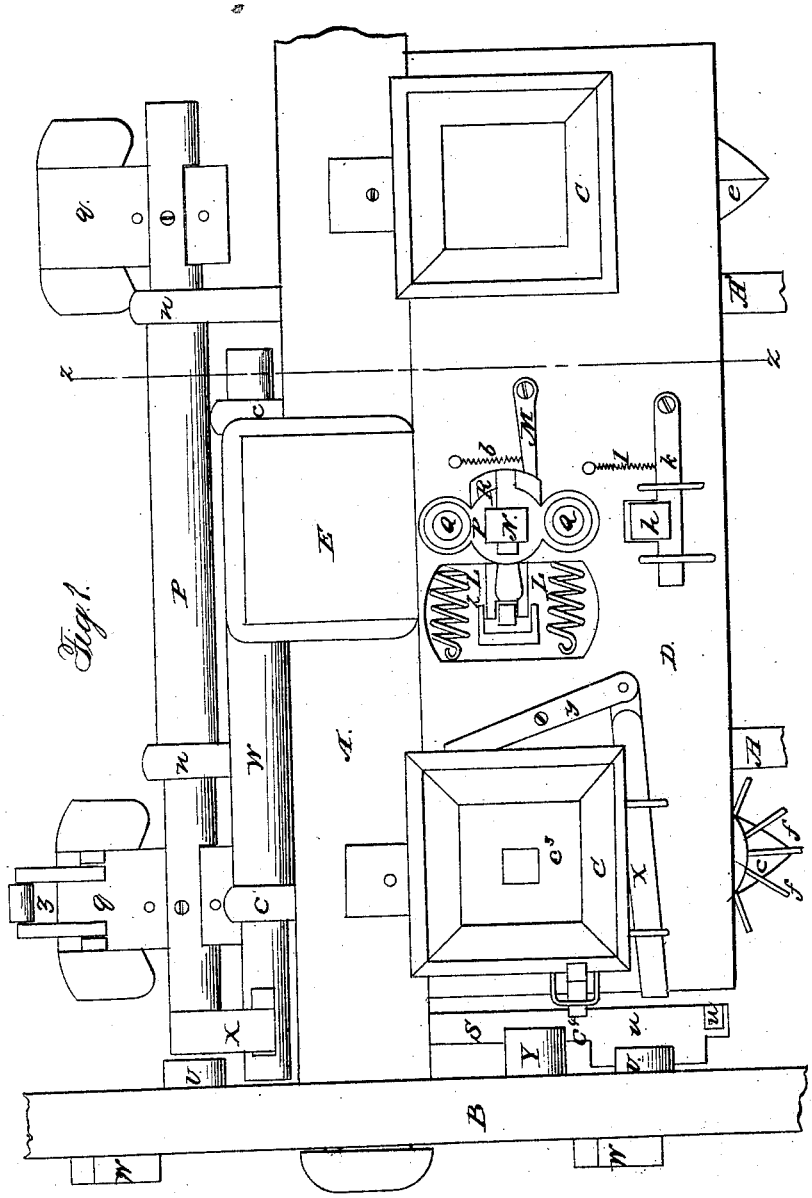

L. F. WARD.
Potato Planter.
No. 18,716.
3 Sheets—Sheet 2.
Patented Nov. 24, 1857.
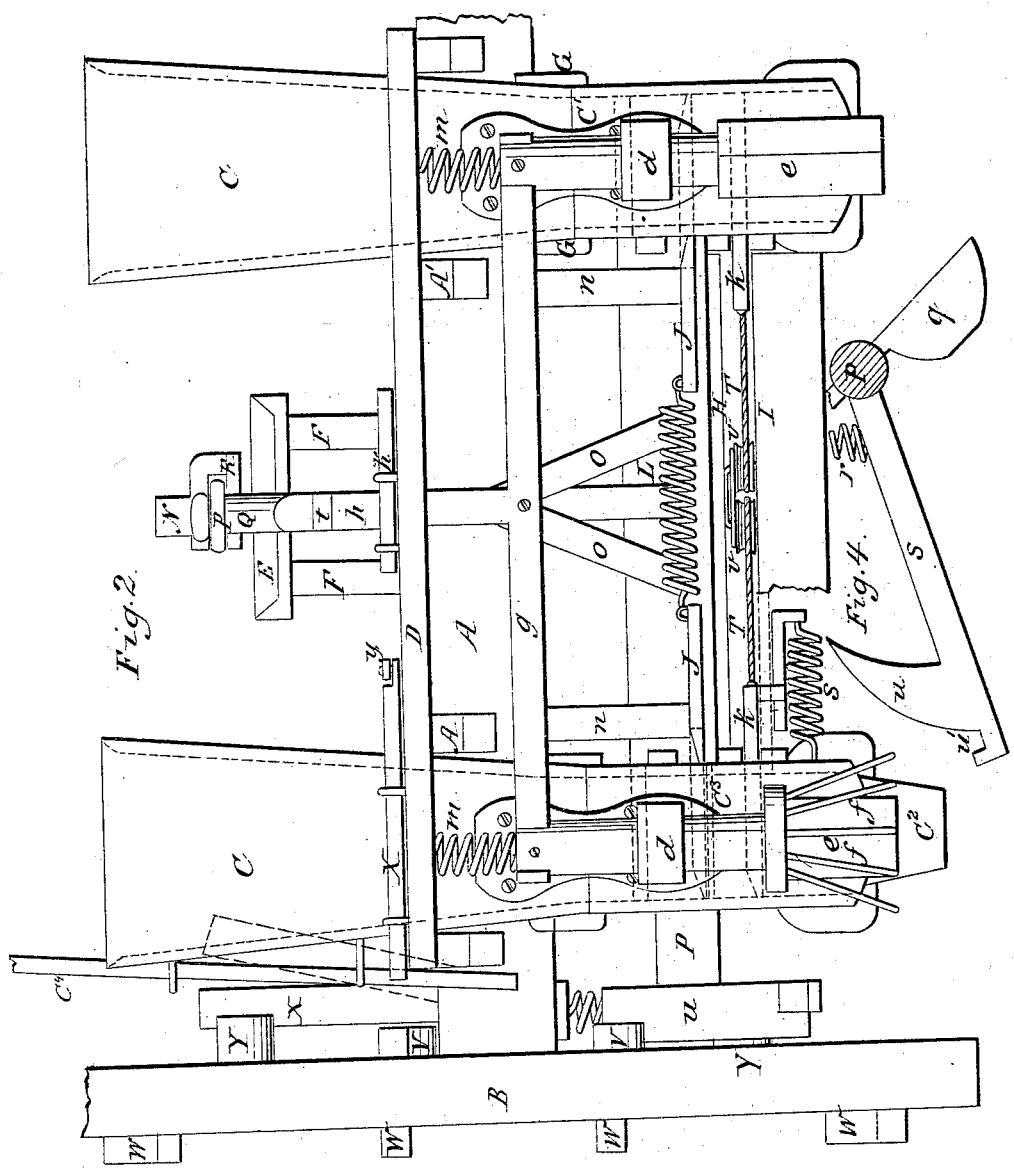

L. F. WARD.
Potato Planter.
3 Sheets—Sheet 3.
No. 18,716.
Patented Nov. 24, 1857.
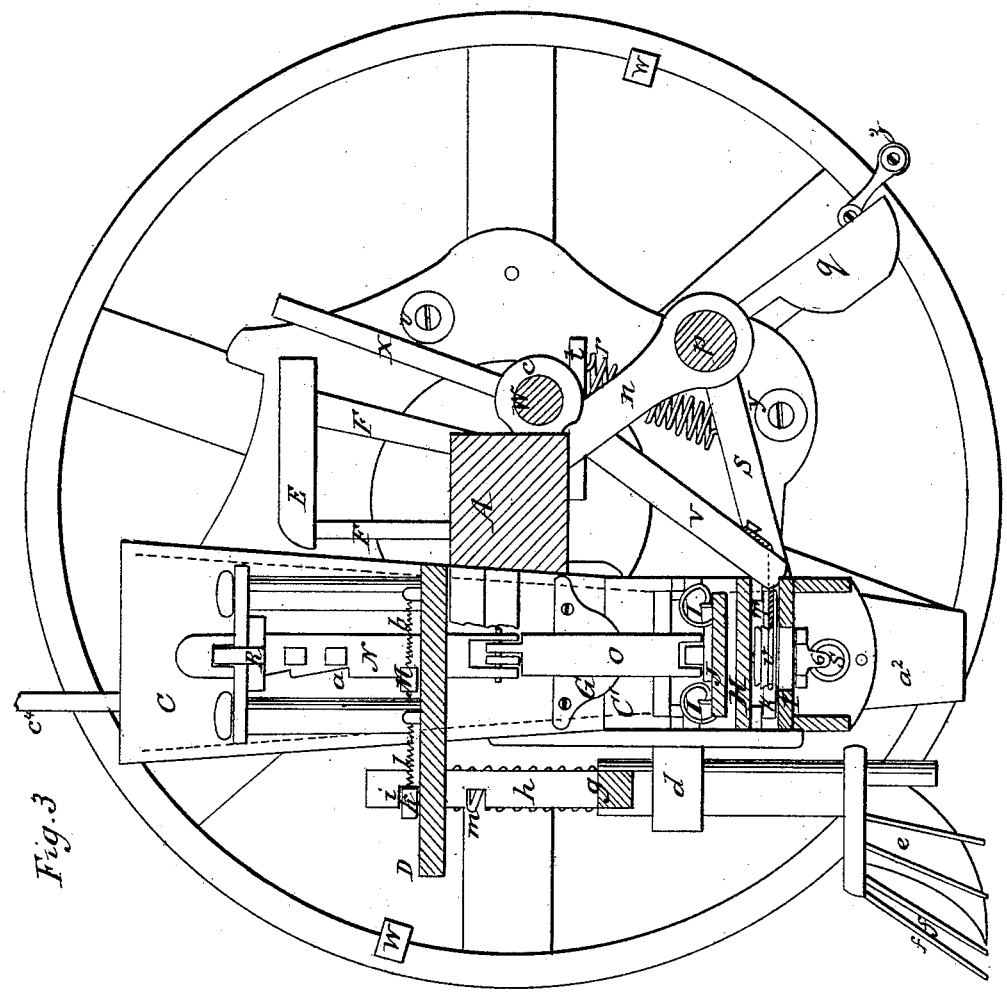

UNITED STATES PATENT OFFICE.

L. F. WARD, OF MARATHON, NEW YORK.

IMPROVEMENT IN SEED-PLANTERS.

Specification forming part of Letters Patent No. 18,716, dated November 24, 1857.

*To all whom it may concern:*

Be it known that I, L. F. WARD, of Marathon, in the county of Cortland and State of New York, have invented certain new and useful Improvements in Machines for Planting Potatoes, Corn, and other Seeds; and I do hereby declare that the same are described and represented in the following specification and drawings.

To enable others skilled in the art to make and use my improvements, I will proceed to describe their construction and operation, referring to the drawings, in which the same letters indicate like parts in each of the figures.

Figure 1 is a plan or top view of a machine with my improvements. Fig. 2 is an elevation of the front. Fig. 3 is a section to the left of the line $z\,z$, Fig. 1. Fig. 4 is an elevation of rock-shaft $p$, arm $s$, and curved incline $u$.

The nature of my invention and improvements in seed-planters consists in the arrangement of scrapers to gather the earth and draw it over the deposits of seed, and then rise automatically and leave the earth in a hill upon the seed, and after passing the hill over the deposit of seed to descend again and gather the earth and draw it over the next deposit of seed and leave it in the same manner, the devices for raising and lowering the scrapers being operated by the wheel on which the machine travels; also, in arranging two slides in the seed-boxes, one above the other, and operating them alternately, so as to hold and deliver the seed as required.

In the accompanying drawings, A is the axle, and B B the wheels, of the machine.

C C are seed-boxes, fastened to the axle A in an upright position.

D is a floor for the driver, between and in front of the seed-boxes C C.

E is the driver's seat, supported by four standards, F F, from the axle A.

The lower section, C', of the seed-boxes are made separate from the upper parts, and connected to them by the brackets G G, so that they may be changed to apply different sizes and adapt them to the several kinds of seed to be planted.

Between the lower parts of the seed-boxes C' there are two shelves, H and I; and to hold up and deliver the seed I cut slots in the seed-boxes just above the shelves H and I, and arrange slides J J to slide through the slots above the shelf H, so as to close the opening in the seed-box and prevent the seed from descending while the slide is in, and also similar slides, K K, above the shelf I. These last slides stop the seed when the upper ones, J J, are drawn out by the spiral springs L L to let down a charge of seed onto the lower slides, when the driver releases the latch M with his foot from the traverse-rod N and lets it ascend, this rod being connected to the slides J J by the links O O, Fig. 2, and is pushed up by the links when the springs draw out the slides. The rod N is arranged to traverse through the floor D, and is guided and supported by the cross-head P, fastened to it and arranged to traverse on the standards Q Q, fastened to the floor D. The foot-piece R is fastened to the traverse-rod N, to enable the driver to push down the rod and push out the slides J J to cut off the charge of seed, and the latch M is drawn over the notch $a$ in the rod N by the spiral spring $b$, to hold it (the rod) down and the slides out until the slides K K are drawn out to drop and deposit the seed between the slides, and are drawn in again by the spiral springs under the shelf I, connected to them. One of these springs is shown at S, Fig. 2.

The slides K K are drawn out to deliver and deposit the seed at the proper time by the cords T T, which pass around the pulleys U U, which turn on pins in the shelf I, and the cord is fastened to the end of the arm V of the rock-shaft W, which shaft turns in brackets $c\,c$, fastened to the axle A, and is provided with an arm, X, which is operated by the roller Y, fastened to the wheel B, so as to turn the shaft W and draw out the slides K K to drop the seed, as above mentioned. After the roller Y passes the arm X the springs S draw in the slides K K and turn the shaft W back again, and when the driver hears the slides K K close he pushes the latch M out of the notch $a$ and lets the traverse-rod N rise and draw the slides J J to let down a charge of seed, and then pushes the traverse-rod N down again to close the slides while the seed is being deposited by the slides below them.

There may be several or a series of slots in the seed-boxes for the slides J J, so that they may be arranged and operated higher or lower to adapt the space between the upper and lower slides to the kind or quantity of seed to be delivered, so as to change the machine with facility from planting corn to planting potatoes, and vice versa.

The brackets d d are fastened to the seed-boxes for the shanks of the furrowing-teeth to traverse in, which teeth e e may be made in the form shown or in such other form as will answer the purpose. One of these teeth is represented with prongs f f around it, which rake and remove sods, stones, or rubbish from before the tooth. The shanks of the teeth e e are fastened to the bar g, which has a standard, h, in it, passing up through the floor D. This standard is provided with a notch, i, for the latch k, which is drawn into it by the spiral spring l, so that the driver can force the furrowing-teeth e e down, and the latch will hold them until it is pushed out of the notch i, when the spiral springs m m will draw the furrowing-teeth up, so that the machine can be conveniently taken from one field to another, and when doing so the arm X may be swung into the position shown by broken lines, so that the roller Y will not vibrate it. This may be done whenever it is desirable to stop delivering the seed or in passing around the ends of the rows.

To cover the seed deposited, I fasten two stands, n n, to the axle A, for the rock-shaft p to turn in, which shaft is provided with mortises for the shanks of the scrapers q, which are made in the form shown in the drawings, and pressed against the ground by the spiral spring r, so as to scrape the earth together and draw it over the seed deposited.

The rock-shaft p is provided with an arm, s, which is held up by the spring r, (to press the scrapers against the ground,) which is fastened to the bracket t on the axle A. The inclined curve u is fastened to the arm S, and is acted upon by the roller v on the wheel B to depress the arm and raise the scrapers q so as to leave the earth scraped together in a hill over the seed deposited, and when the roller v passes off of the incline u the spring r draws up the arm and depresses the scrapers to draw the earth over the next deposit of seed.

To make the deposits of seed in rows, so that the crop may be cultivated both ways or at right angles, the markers w w are fastened to the wheel B in such positions that the seed will be deposited directly opposite to the space between them. The wheels should be arranged just half as far from the planting-tubes or seed-box as the tubes are apart, so that the wheel with the markers can return in the same track in which it went; and the markers should be made to strike in the same places or directly opposite the marks made when the machine was passing in the opposite direction. After turning the machine at the end, if the markers do not strike right, the bar x may be pushed out by the lever y, so as to stop the wheel and make it slip until the markers come opposite their previous marks, when the wheel may be released by drawing in the bar x.

If it is desirable to roll the earth and press it upon the seed, a roller may be hinged to and arranged behind the scraper q, as shown at z in the drawings. The seed planted by this machine may be deposited in a small area or space by fastening some tapering or tunnel shaped tubes in the bottom of the seed-boxes, as shown at $C^2$, Fig. 2. The shafts A' A' are represented as broken off, to which shafts an animal may be harnessed in some convenient manner to draw the machine.

In planting corn or other small seeds a board, $C^3$, may be fastened in the seed-box, with a hole in it, in such a position that slide J will just traverse on top of it; and this board may have a slide in it, so as to vary the hole through it without taking it out. The rod $C^4$ is arranged to traverse in staples in the seed-box, and has a notch in it to catch on the seed-box and hold it up when not in use, to push down the end of the arm s, so that the roller v will pass over the incline u when the machine is pushed backward. $u'$ is a cavity for end of rod $C^4$.

This machine may be provided with such a number of rollers upon the wheel to operate the slides and scrapers as may be required to deposit the seed at such distances as may be desired; and the number of markers on the wheels may be increased to correspond with the rollers. I contemplate that the upper slides may be operated automatically by devices similar to those which operate the lower slide or such others as will answer the purpose. With my improvements the earth may be scraped together and drawn over the seed and left in a hill upon it, so as to cover it with earth the required depth by the machine working automatically, which was never accomplished prior to the date of my invention. My planting-tubes allow the seed to scatter more in the hill than any I have ever seen, so that the plants can take root without crowding.

I believe I have described and represented my improvements in seeding-machines so as to enable any person skilled in the art to make and use them.

I will now state what I desire to secure by Letters Patent, to wit:

1. The covering-scrapers q q, in combination with the pressing-rollers z z, when constructed and operated substantially as described.

2. In combination with the furrowing-teeth e e, arranged to traverse perpendicularly, the bar g, standard h, springs m m, and locking-latch k, for raising, lowering, and holding the furrowing-teeth in the required position, substantially as described.

3. The arrangement of the traverse-rod N, links O O, and springs L L, for the purpose of operating the slides J J, as described.

L. F. WARD.

Witnesses:
A. PECK,
J. COMSTOCK.